United States Patent
Kelly et al.

(10) Patent No.: US 9,569,276 B2
(45) Date of Patent: Feb. 14, 2017

(54) SYSTEM AND METHOD FOR DYNAMIC USER ASSIGNMENT IN A VIRTUAL DESKTOP ENVIRONMENT

(71) Applicant: Dell Products L.P., Round Rock, TX (US)

(72) Inventors: John Kelly, Dooradoyle (IE); Yinglong Jiang, Murroe (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/658,390

(22) Filed: Mar. 16, 2015

(65) Prior Publication Data

US 2016/0274948 A1    Sep. 22, 2016

(51) Int. Cl.
G06F 9/46      (2006.01)
G06F 9/50      (2006.01)
G06F 9/455    (2006.01)

(52) U.S. Cl.
CPC ......... G06F 9/5077 (2013.01); G06F 9/45558 (2013.01); *G06F 2009/4557* (2013.01)

(58) Field of Classification Search
CPC ................ G06F 9/4881; G06F 9/45558; G06F 2009/4557
See application file for complete search history.

(56) References Cited

U.S. PATENT DOCUMENTS

| 8,141,075 B1* | 3/2012 | Chawla ............... G06F 9/45558 718/1 |
| 8,387,060 B2 | 2/2013 | Pirzada et al. ................. 718/104 |
| 8,566,427 B2 | 10/2013 | Radhakrishnan et al. .... 709/220 |
| 9,280,376 B2 | 3/2016 | Alessio et al. |
| 2015/0256474 A1* | 9/2015 | Ringdahl ................ H04L 67/10 709/226 |

* cited by examiner

*Primary Examiner* — Camquy Truong
(74) *Attorney, Agent, or Firm* — Baker Botts L.L.P.

(57) ABSTRACT

A system and method for dynamically re-allocating a user to an alternative virtual desktop pool. A virtual application may monitor relevant parameters related to resource utilization and end-user experience. Certain information, for example, information provided by an administrator, related to capabilities and capacity of one or more virtual desktop pool capabilities may be stored. The virtual appliance may re-allocate or migrate the user to an alternative virtual desktop pool based, at least in part, on the monitored parameters and the stored capabilities and capacity information. Any changes in the user's activities may be reflected in further re-allocation of the user to another alternative virtual desktop pools to ensure a suitable end-user experience.

16 Claims, 4 Drawing Sheets

SYSTEM AND METHOD FOR DYNAMIC USER ASSIGNMENT IN A VIRTUAL DESKTOP ENVIRONMENT

FIELD OF THE DISCLOSURE

This disclosure relates generally to information handling systems, and more particularly relates to dynamic allocation of users to desktop pools in an adaptive desktop virtualization environment by monitoring certain parameters by a virtual appliance, storing certain parameters and combining the parameters in a way to ensure users are allocated to the appropriate desktop pool.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A virtual environment, such as a virtual desktop infrastructure (VDI), separates a desktop environment and its associated software in a data center, from the information handling system that is used to access the desktop environment.

Virtual desktop environments have become prevalent in the enterprise information technology domain. These environments are presented as offering many advantages over the conventional physical personal computer (PC) paradigm, such as enhanced security, compatibility with a wider range of user endpoint devices and reduced total cost of ownership (TCO) for enterprises. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

Pooled resources or virtual desktop pools are a commonly used approach for providing users with access to VDI and SBC environments. For example, allocation of a user to a virtual desktop pool may be based on a largely crude analysis of a particular user's requirements based on such factors as organizational alignment such as membership in the accounting department or the human resource department. Users may be presented with a poor end-user experience and organizations may see poor utilization of computer resources due to the lack of an optimal re-allocation of the users to virtual desktop pools as the re-allocation of users to these virtual desktop pools may rely on ad-hoc methods such as help desk calls and resource utilization alarms.

SUMMARY

In accordance with the present disclosure, a system and method are herein disclosed for providing dynamic allocation of users to virtual desktop pools in an adaptive desktop virtualization environment to provide a better end-user experience and more efficient utilization of computer resources. Generally, existing technologies lack an automated technique for re-allocation of users to a more suitable virtual desktop pool such as VDI or SBC pools. In particular, the present disclosure describes a system and method for an information handling system to provide an adaptive desktop virtualization environment that allows for pool-aware monitoring and user re-allocation activity by combining rules-based and monitored data-based approaches to synthesize recommendations for user migration to an alternative virtual desktop pool in a desktop virtualization environment. By dynamically re-allocating users to virtual desktop pools, the users are presented with a better end-user experience and computer resources are more efficiently utilized. Other technical advantages will be apparent to those of ordinary skill in the art in view of the following specification, claims.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
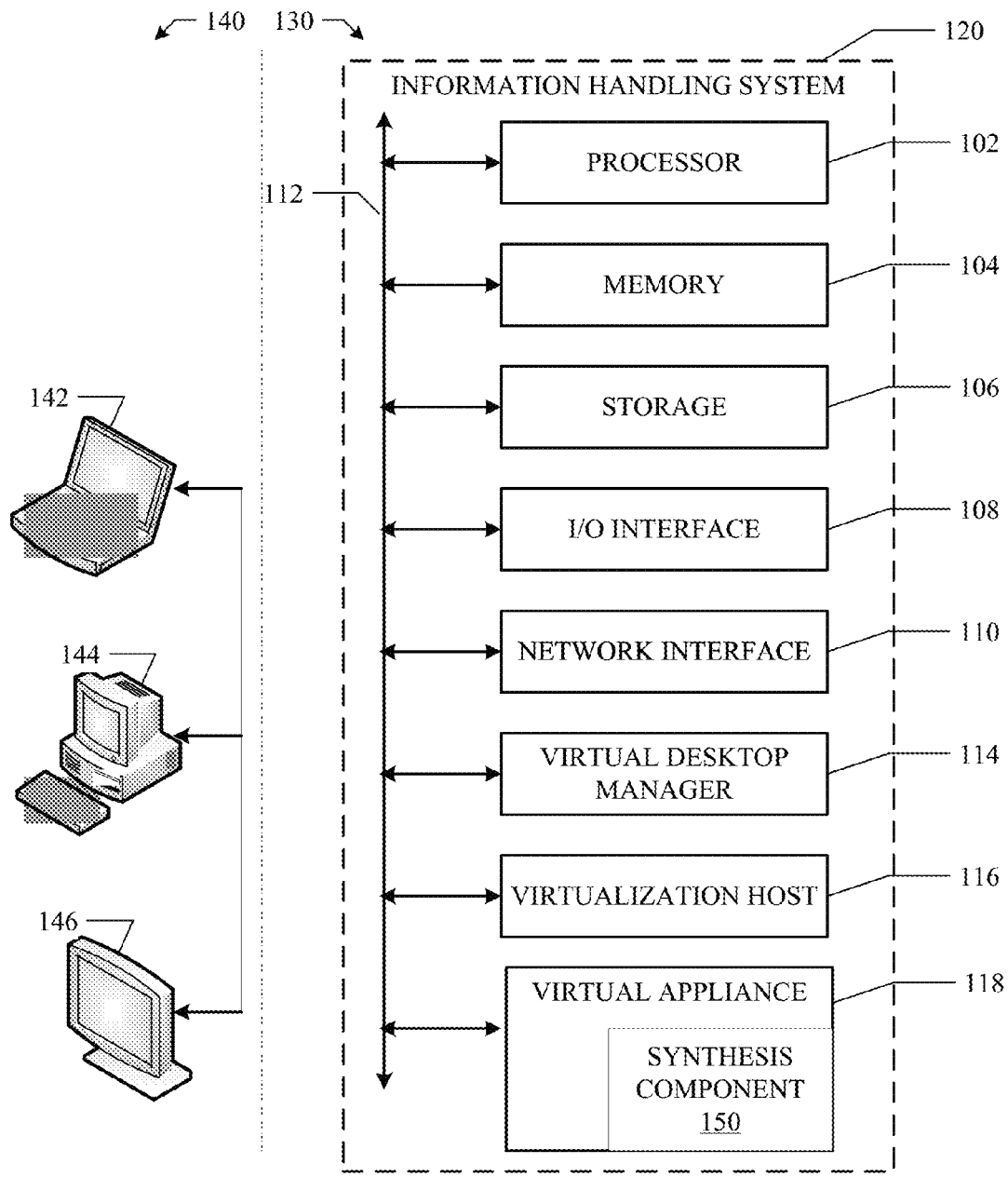
FIG. 1 is a block diagram of an information handling system according to an embodiment of the present disclosure.

The following description in combination with the Figures is provided to assist in understanding the teachings disclosed herein. The following discussion will focus on specific implementations and embodiments of the teachings.

This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

This disclosure generally relates to a virtual appliance for the implementation of dynamic allocation and re-allocation of users to virtual desktop pools. For example, a virtual appliance of the information handling system may monitor relevant parameters related to hardware resource utilization and end-user experience and accept information in relation to virtual desktop pool capabilities. The information related to virtual desktop pool capabilities may be provided by, for example, an administrator, IT specialist, any other person qualified to provide such information, a database or any other storage repository, or by any other way known to one of ordinary skill in the art. The virtual appliance may then dynamically allocate users to different virtual desktop pools based on the monitored parameters and pool capability information.

Such technologies for virtual environments may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

The present system and method involve an information handling system that provides for a virtual appliance that provides for dynamic allocation and re-allocation of users to virtual desktop pools. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), system management RAM (SMRAM), one or more processing resources such as a central processing unit (CPU) or hardware or software control logic, read-only memory (ROM), and/or other types of nonvolatile memory. Additional components of the information handling system may include an interface to a virtual machine manager, an interface to a web console, an interface to a management console, a remote access controller, a hypervisor, one or more disk drives, one or more network ports for communication with external devices as well as various I/O devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example, without limitation, storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory.

FIG. 1 illustrates a virtual desktop environment 100 that can be implemented on one or more information handling systems. For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An example of an information handling system includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Virtual desktop environment 100 includes a user environment 140 and a virtualization environment 130. User environment 140 includes user systems 142, 144, and 146. User systems 142, 144, and 146 may be any type of information handling system known to one of ordinary skill in the art. For example, user systems 142, 144, and 146 may be laptop computers, PCs, thin-clients, smart monitors, tablets, phablets, or any other device known to one of ordinary skill in the art that can connect to a network as an endpoint for virtualization environment 130. While three devices are shown as user systems 142, 144, and 146, one of ordinary skill in the art would understand that user systems 142, 144, and 146 may be any number of suitable devices.

In one or more embodiments, virtualization environment 130 includes an information handling system 120 capable of deploying virtual machines. Information handling system 120 may comprise any number of devices and may be any number of information handling systems suitable to implement the virtualization environment 130. Information handling system 120 includes a processor 102, memory 104, storage 106, an input/output (I/O) interface 108, a network interface 110, and a bus(es) 112. Although this disclosure describes and illustrates a particular information handling system 120 having a particular set of particular components in a particular arrangement, this disclosure contemplates any suitable information handling system having any suitable combination and arrangement of components as known to one of ordinary skill in the art. For example, virtualization host 116, virtual desktop manager 114, and virtual appliance 118 may be implemented on information handling system 120 or may be implemented on any suitable combination of information handling systems.

Virtual desktop environment 100 operates to present an adaptive desktop virtualization environment by creating multiple sets of desktop pooled resources to provide the users of user systems 142, 144, and 146 with appropriate environments. The virtual desktop manager 114 authenticates any user system and also determines the operating system environment and application software needs of the authenticated user systems. The virtual desktop manager 114 instantiates a virtual machine associated with each authenticated user system.

In an example embodiment, processor 102 may include hardware and software components for the structure and operation of the process steps and system disclosed. While not specifically shown, it should be understood that any number of program modules comprising computer-readable instructions may be stored in the information handling system storage 106 or other memory and may be executed by processor 102. Upon execution of the computer-readable instructions, certain actions may be performed as described in this disclosure.

Storage 106 or memory 104 or other such memory may be one or more of a hard-disk drive, solid state drives, RAID array, magnetic disk, optical disk, ROM, RAM or any other computer media known to one of ordinary skill in the art for the storage and retrieval of data, including executable or computer-readable instructions. A virtualization environment 130 typically requires the sending and receiving of large amounts of data. Data may be stored in any one or more of storage 106 and memory 104. As is known to one of ordinary skill in the art, some storage mediums have faster data access times than other storage mediums. For example, long-term data or data that does not need to be accessed frequently or quickly may generally be stored on a hard-disk drive or other non-volatile storage medium, such as storage 106, known to one of ordinary skill in the art. Retrieving and storing data to storage 106 may increase the time to perform an I/O operation as access times are typically longer than performing I/O operations from a faster storage medium, for example, memory 104. The I/O operations per second (IOPS) associated with performing I/O operations to a storage 106 may not meet the requirements necessary to implement efficiently VDI 130 and thus memory 104 must be used to ensure efficient access to data within VDI 130 where memory 104 resources allow.

In one embodiment, storage 106 is non-volatile long-term memory such as a hard-disk drive, magnetic disk, optical disk, RAID array or any other storage device or storage devices known to one of ordinary skill in the art. Storage 106 may host a database, such as an indexed database, flat file database, or any other database known to one of ordinary skill in the art. The present invention is not limited to a database but encompasses any other system known to one of ordinary skill in the art for organizing data. Storage 106 typically has a longer access time than memory 104. In one embodiment, memory 104 may be memory with reasonably fast access times, such as RAM. Memory 104 may be any memory known to one of ordinary skill in the art that provides efficient access to data, for example, RAM, suitable for use as cache for virtualization environment 130. In this disclosure, RAM may be used interchangeable with memory 104 but is not intended to limit memory 104 to RAM only memory. In another embodiment, memory 104 includes main memory for storing instructions for processor 102 to execute or data for processor 102 to operate on. As an example, information handling system 120 may load instructions for execution from storage 106 or another source (such as, for example, another information handlings system 120, an external memory source, a remote memory source, or any other memory source known to one of ordinary skill in the art) to memory 104. Bus 112 may include one or more buses for connecting processor 102, memory 104, storage 106, I/O interface 108 and network interface 110.

In another embodiment, I/O interface 108 includes hardware, software, or both for providing one or more interfaces for communication between information handling system 128 and one or more I/O devices. Information handling system 128 may include one or more I/O devices, where appropriate. One or more of these I/O devices may enable communication between a user or other software and information handling system 120. As an example, an I/O device may include a keyboard, keypad, microphone, monitor, mouse, or any other I/O device known to one of ordinary skill in the art or a combination of two or more I/O devices. For example, the I/O device may allow a user or other software to request instantiation of a virtual application. I/O interface 108 may include one or more devices or software drivers enabling processor 102 to drive one or more of these I/O devices. I/O interface 108 may include one or more I/O interfaces 108, where appropriate. Although this disclosure describes and illustrates a particular I/O interface, the disclosure contemplates any suitable I/O interface.

In an example embodiment, network interface 110 includes firmware, hardware, software, or any combination thereof for providing one or more interfaces for communication (for example, packet-based communication) between information handling system 120 and one or more other information handling system 128 on one or more networks. For example, network interface 110 may include a network interface controller (NIC) or network adapter for communicating with a telephone network, an Ethernet or other wire-based network or a wireless NIC (WNIC) or wireless adapter for communicating with a wireless network, such as a WI-FI network, or any other network interface for communicating with any type of network known to one of ordinary skill in the art. In one embodiment, information handling system 120 may connect to user systems 142, 144, and 146 through a network via a wireless or wired connection using any protocol known to one of ordinary skill in the art.

In an example embodiment, bus 112 includes hardware, software, or both which couples components of information handling system 120 to each other. Bus 112 may include one or more buses where appropriate and may communicatively, physically, virtually, or otherwise as required couple the components of information handling system 128 to each other. Bus 112 may connect one or more information handling systems 128 to each other. For example, bus 112 may connect an information handling system hosting any combination of the virtualization host 116, VDI manager, virtual desktop manager 114, and virtual appliance 118.

Virtual environment 130 includes a virtual desktop manager 114, a virtualization host 116, and a virtual appliance 118. Virtual desktop environment 100 operates to present appropriate environments from pooled virtual desktop resources to users of user systems 142, 144, and 146. In particular, when one of the user systems 142, 144, and 146 logs on to virtual environment 130, virtual desktop manager 114 authenticates the user, determines the operating system environment and application software needs of the user, and directs virtualization host 116 to instantiate a virtual machine that is associated with the user, and that runs the operating system environment and application software. Virtualization host 116 may include a virtual machine manager (VMM) (not shown) that operates to manage any instantiated virtual machine. For example, when a user system 142 connects to virtual environment 130, virtual desktop manager 114 directs virtualization host 116 to instantiate a virtual machine associated with the user system 142. Similarly, for example, a virtual machine may also be instantiated when user system 144 connects to virtual environment 130, and a virtual machine may also be instantiated when user system 146 connects to virtual environment 130. As understood by one of ordinary skill in the art, the VMM may manage as many virtual machines as permitted by information handling system 120. In one embodiment, virtualization host 116 may include a hypervisor as the VMM. Virtualization host 116 may be implemented as a single host for one or more virtual desktop pools or may be implemented as two or more hosts (not shown) for any number of virtual desktop pools. Likewise, any given virtual desktop pool can include any number of virtualization hosts 116.

Virtual appliance 118 of information handling system 120 may be any combination of hardware and/or software. Virtual appliance 118 monitors one or more parameters associated with a user's hardware resource utilization and end-user experience. The virtual appliance 118 may also monitor for each virtual desktop pool one or more appropriate capability and capacity related parameters. Capability related parameters relate generally to configuration information, for example, number of virtual CPUs (vCPUs), and functionality information, for example, presence of a graphics processing unit (GPU), within a virtual desktop pool's virtual desktops while capacity related parameters relate generally to hardware resources (CPU, memory, disk space, I/O, and network bandwidth) available to and used by the virtualization hosts that are allocated to the relevant virtual desktop pool. With respect to capability related parameters, administrator provided rules may also be used. All of the monitored parameters may be stored in an appropriate database format on the virtual appliance 118 or in any other suitable form and on any other medium known to one of ordinary skill in the art. These monitored parameters may be continuously monitored. These monitored parameters may also be monitored at pre-determined timed-intervals or timed-intervals set by any one or more users or administrators, or according to a threshold value, or according to a semaphore, flag, thread, alert, event, or any other appropriate timing interval known to one of ordinary skill in the art.

Virtual appliance 118 may include a synthesis component 150. The synthesis component 150 is the engine of the re-allocation of a virtual desktop pool to a user. The synthesis component 150 may aggregate demand information of any virtual desktop resource available to a user as discussed with respect to FIG. 2 and virtual desktop pool capacity and capability information as discussed with respect to FIG. 3. The synthesis component may be implemented as a scheduled task at any predetermined timed interval. The scheduled task may also be designated to be implemented on a timed interval as requested by a user, an administrator, an operator or in any other manner known to one or ordinary skill in the art. In one example, a user may be re-allocated to an alternative virtual desktop pool due to insufficient or excessive resources available in the user's currently allocated virtual desktop pool. In another example, a user may be re-allocated to an alternative desktop pool when the user's current virtual desktop pool includes a virtualization aware graphics card but the user is not utilizing a significant number of graphics application program interface (API) calls or where the user's current virtual desktop pool does not include a virtualization aware graphics card but the resource utilization of the user indicates sustained usage of graphics APIs calls.

Figure 2:
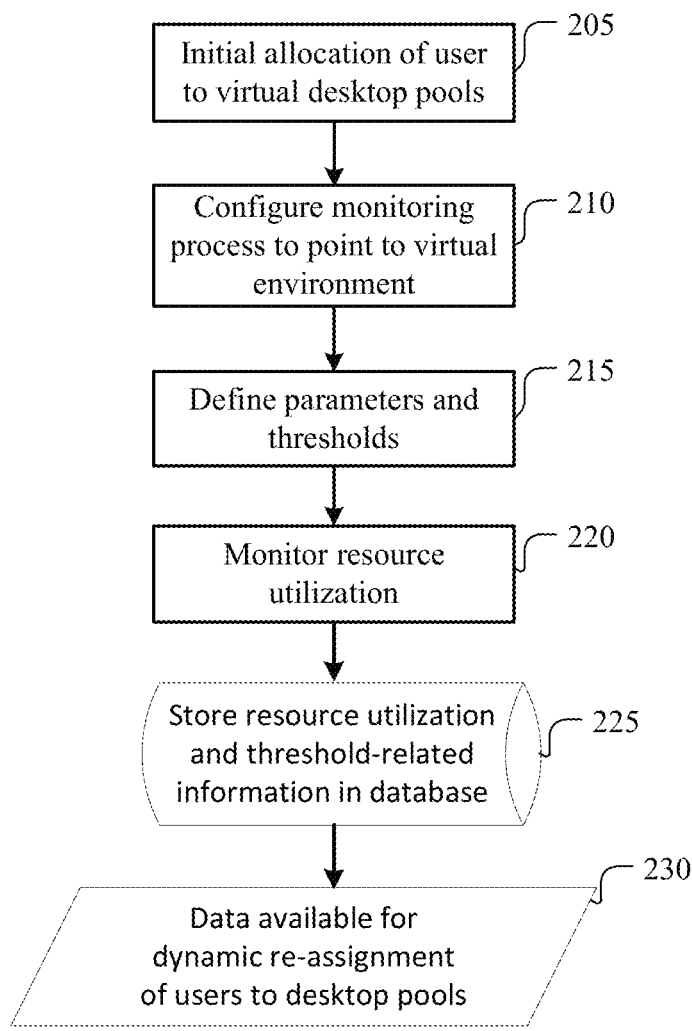
FIG. 2 is a flowchart of a method of an information handling system according to an embodiment of the present disclosure.

FIG. 2 illustrates a method of monitoring and storing hardware resource utilization and end-user experience related information shown generally at 200. In one embodiment of the adaptive desktop virtualization environment, users are allocated to one or more virtual desktop pools at block 205. At block 210, a monitoring process running on the virtual appliance 118 is configured to point to a virtual environment. For example, the virtual environments discussed above such as VDI, SBC, and application virtualization technologies. These virtual environments may use the concept of virtual desktop pools. A virtual desktop pool may be a group of identically configured VDI virtual machines or SBC user resources that are allocated to virtual desktop pool users on a random basis due to the identical configuration and resource levels of the particular virtual desktop pool and the perceived similarity in the compute requirements of individual pool users.

At block 215 of FIG. 2, parameters and thresholds are defined. For example, typical hardware resource utilization parameters to be gathered at block 215 include server level, virtual desktop level and end-user experience related parameters. Virtual desktop level parameters may include CPU parameters (for example, parameters indicative of the percentage utilization of each CPU core of the virtual desktop), memory utilization parameters, network utilization parameters, graphics API parameters (for example, parameters indicative of graphics API call frequency and duration of use for such graphics API as OpenGL and DirectX), storage 10 latency and any other virtual desktop level parameters known to one of ordinary skill in the art. End-user experience related parameters may include user login time to the user's virtual desktop, user application launch time, number of applications not responding, duration that applications are not responding, and other end-user experience related parameters known to one of ordinary skill in the art. Any number of thresholds may be associated with these parameters including maximum utilization thresholds.

At block 220 of FIG. 2, the virtual appliance 118 monitors resource utilization. The virtual appliance 118 monitors the associated resource utilization of the defined parameters and thresholds. The monitoring by the virtual appliance 118 occurs using, for example, standard resource utilization monitoring processes. The virtual appliance 118 at block 225 stores the resource utilization and threshold related information in a database or any other data organizational tool known to one of ordinary skill in the art and as discussed with respect to FIG. 1. The database may be located at virtual appliance 118 or at any other suitable location known to one of ordinary skill in the art. Once the virtual appliance has stored the information, this information or data is available, at block 230, for use to dynamically re-assign users to virtual desktop pools.

Figure 3:
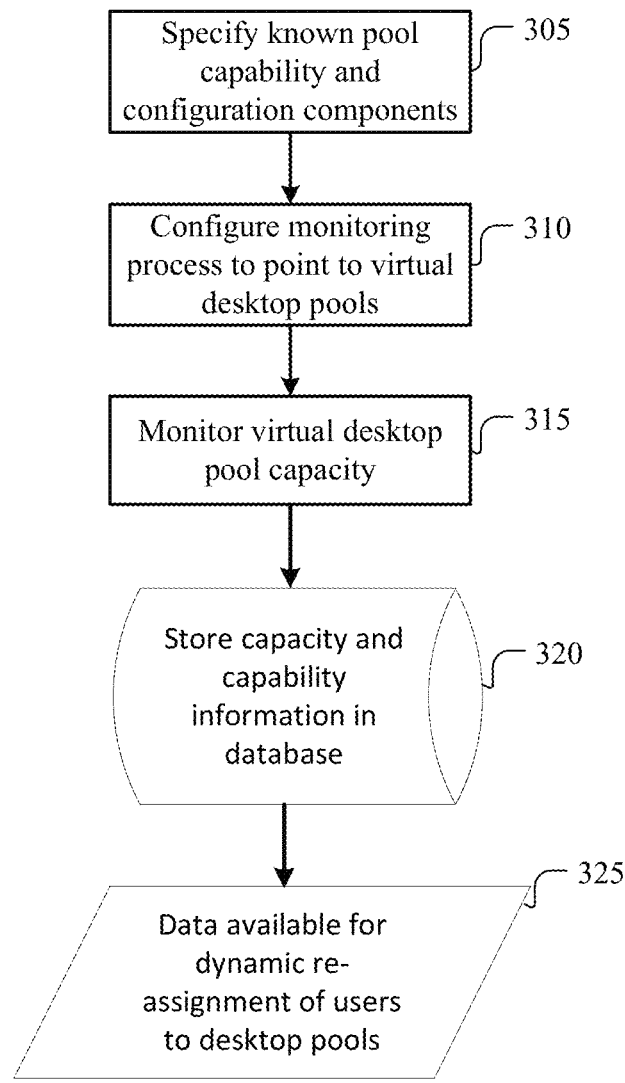
FIG. 3 is a flowchart of a method of an information handling system according to an embodiment of the present disclosure.

FIG. 3 illustrates a method of monitoring and storing virtual desktop pool capability and capacity shown generally at 300. The process flow of FIG. 3 is similar to that of FIG. 2 with respect to resource utilization and end-user experience monitoring but the current activity, including virtual desktop pool-level monitoring and specification, is supply-oriented, that is the type of resources the virtual desktop pool can supply, as opposed to demand-oriented as illustrated in FIG. 2 where the focus is on the needs of the virtual desktop. In one embodiment, the process shown generally at 300 combines information provided by an administrator, for example, with information gathered through hardware resource utilization monitoring to calculate the capabilities and capacity of the virtual desktop pools. At block 305, the known virtual desktop pool capabilities and configuration components are specified for the virtual desktop pool. For example, a graphics-oriented virtual desktop pool may be specified which uses a desktop virtualization aware graphics card, or any graphics card whose graphics API processing capabilities can be utilized by virtual desktop, to provide virtual desktop capabilities. Such desktop virtualization aware graphics cards may include the Nvidia Grid K1 or K2 cards or any such cards known to one or ordinary skill in the art. In another embodiment, the capability of any virtual desktop pool may be specified in terms of the number of virtual CPUs with which virtual desktops in that virtual desktop pool are configured.

At block 310, a monitoring process is configured to point to any one or more of the virtual desktop pools. In one embodiment, the monitoring process at block 310 comprises an administrator configuring a virtual desktop pool for monitoring by using a graphical user interface (GUI) presented by the virtual appliance. The administrator may enter the name of the virtual desktop pool to ensure that all monitoring occurs on the correct virtual desktop pool or virtual desktop pools. At step 315 the virtual desktop pool capacity of any one or more of the virtual desktop pools is monitored. A particular virtual desktop pool capacity analysis may generate information based on all resources available to that particular virtual desktop pool.

At block 320, capacity and capability information is stored in a database or any other data organizational tool known to one of ordinary skill in the art. The database may be located at virtual appliance 118 or at any other suitable location known to one of ordinary skill in the art. The capacity information and capability information are based, at least in part, on characteristics of the virtual desktop pool. In one embodiment, capacity information may be based on an analysis of all resources available to the virtual desktop pool. In one embodiment, if certain servers allocated to a particular virtual desktop pool do not have spare capacity but other servers allocated to the same virtual desktop pool do have spare capacity, the capacity information associated with the particular virtual desktop pool may still indicate that the virtual desktop pool has spare capacity. In one embodiment, the capability information may indicate that a particular virtual desktop pool is a graphics-oriented virtual desktop pool. In another embodiment, the capability information may indicate the number of vCPUs that the particular virtual desktop pool is configured to include. In this embodiment, the virtual desktop pool must contain a host with the required number of CPU cores and spare CPU cycles to permit the extra vCPUs to be resourced. In another embodiment, if a virtual desktop is in a particular virtual desktop pool with only one vCPU but requires two vCPUs, a virtual desktop pool must be found that not only contains virtual desktops that are configured with two vCPUs but also one that has the spare CPU cycles to support the additional vCPU. In other embodiments, RAM utilization, disk I/O or any other characteristics of the desktop pool known to one of ordinary skill in the art may be utilized as capability and capacity parameters. Once the virtual appliance has stored the information, at block 325, this information or data is available for use to dynamically re-assign users to virtual desktop pools.

Figure 4:
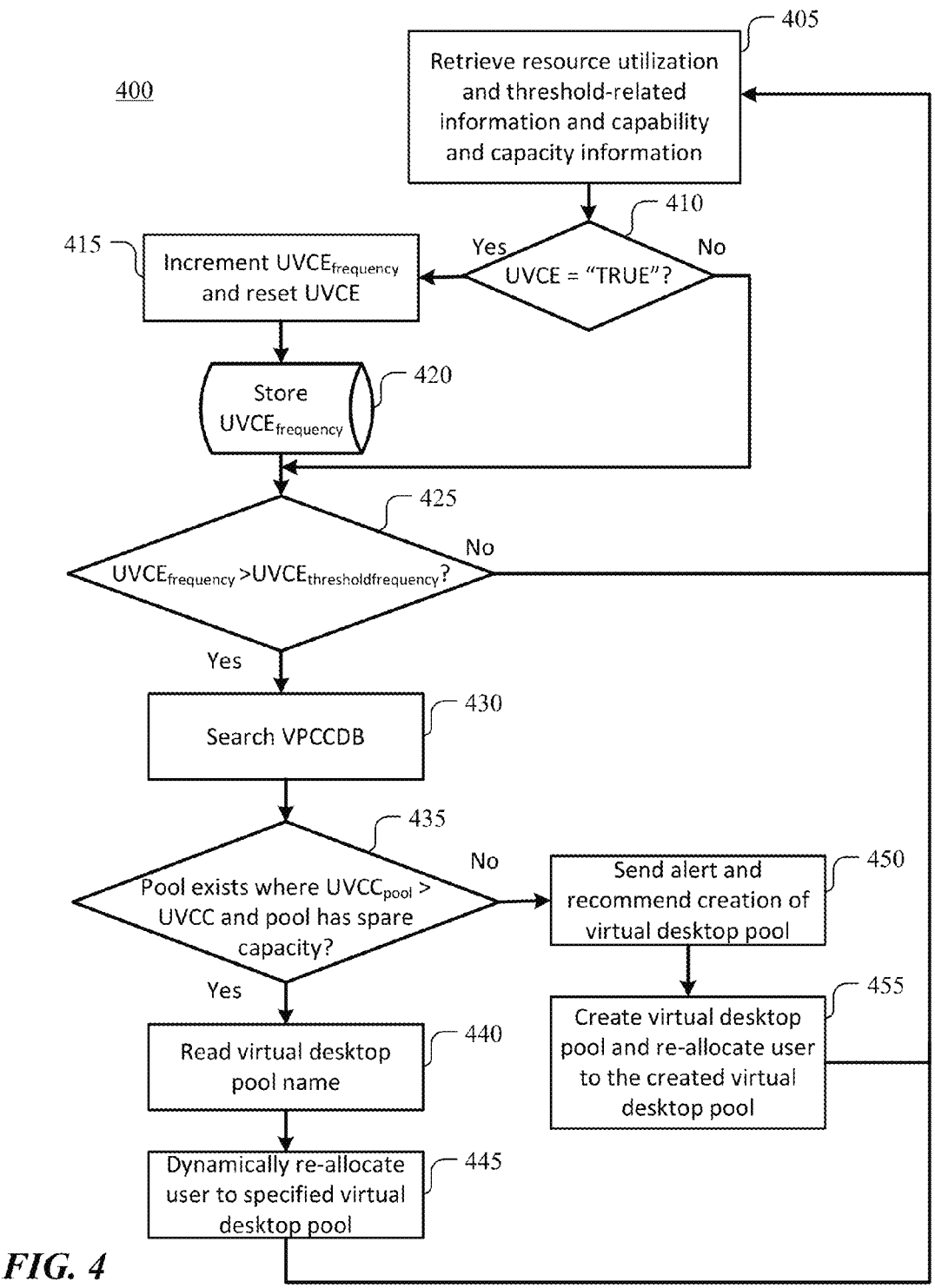
FIG. 4 is a flowchart of a method of an information handling system according to an embodiment of the present disclosure.

FIG. 4 illustrates an embodiment of a method of synthesizing the database information stored in FIG. 2 and FIG. 3 to dynamically re-allocate or migrate users to existing virtual desktop pools or to re-allocate or migrate users to newly created virtual desktop pools. For example, the method illustrated at FIG. 4 may be implemented by synthesis component 150. For example, the synthesis component 150 running as a scheduled task may generate pool migration recommendations based, at least in part, on users being provided with insufficient virtual desktop resources or users being presented with a poor end-user experience due to server-level or virtual desktop level thresholds being exceeded or not met or due to end-user experience criteria. In another example, the virtual desktop level thresholds may be exceeded or are not met on any number of occasions before a recommendation regarding re-allocation of a user to a virtual desktop pool is generated. In another example, a frequency is specified, whether predetermined, set by other criteria, or dynamically adjusted, for which a threshold may exceed or not meet before a recommendation regarding re-allocation of a user to a virtual desktop pool is generated. The re-allocation of a user to a virtual desktop pool may be implemented by one or more APIs. Such APIs are available from vendors such as Dell vWorkspace, VMware, Citrix, Microsoft, and any other known vendors for such APIs. In one embodiment, the method of FIG. 4 runs as a scheduled task on a daily basis to aggregate demand information (as shown in FIG. 2) and capacity and/or capability information (as shown in FIG. 3). In another embodiment, the method of FIG. 4 may be run at any interval including periodically throughout a day or any other set time and/or duration as required by a particular environment. The pseudo-code of TABLE 1 further illustrates the embodiment depicted in FIG. 4 where a virtual desktop that has insufficient CPU resources at the virtual desktop level is re-allocated to virtual desktop pool with virtual desktops that have a higher number of virtual desktop vCPUs. (See TABLE 2 for a listing of definitions for variable names used in TABLE 1).

TABLE 1

```
Read UVCE
if UVCE = TRUE
    increment UVCE_{frequency}
endif
read UVCE_{thresholdfrequency}
if UVCE_{frequency} > UVCE_{thresholdfrequency}
    read UVCC
    search VPCCDB
    if ((POOL exists where UVCC_{pool} > UVCC) and (POOL has SPARE CAPACITY))
        read POOL NAME
        re-allocate USER to NEW POOL
```

TABLE 1-continued

```
  else
    create POOL (RECOMMENDATION: POOL with UVCC + 1 VCPUs)
    re-allocate USER to RECOMMENDED POOL
  endif
endif
end
```

TABLE 2

| | |
|---|---|
| UVCE | User Virtual Desktop CPU Threshold Exceeded flag |
| $UVCE_{frequency}$ | Number of occasions on which UVCE has been set (number of times the virtual desktop CPU threshold has been exceeded) |
| $UVCE_{thresholdfrequency}$ | Number of occasions on which UVCE can be set before a user re-assignment is defined as being required (threshold for the number of times the virtual desktop CPU threshold can be exceeded) |
| UVCC | User Virtual Desktop CPU Configuration (number of virtual CPUs) |
| VPCCDB | Virtual Desktop Pool Capability and Capacity Database |

In one embodiment, at block 405 of FIG. 4 resource utilization and threshold-related information (as stored at block 225 and made available at block 230 of FIG. 2) and capability and capacity information (as stored at block 320 and made available at block 325 of FIG. 3) are retrieved. At block 410, it is determined whether the UVCE (as defined in TABLE 2) has been set to TRUE. The UVCE is set based on the information stored at block 320 of FIG. 3. The UVCE may be a flag, an entry in an array of data or any other type of variable known to one of ordinary skill in the art stored in memory, for example, memory 104 of FIG. 1. The UVCE may be indicated by a single bit. In one embodiment, the UVCE bit may be set to "TRUE" by setting the bit to "1" to indicate that the threshold has been exceeded while setting the bit to "0" would indicate "FALSE" or that the threshold has not been exceed. Any other combination known to one of ordinary skill in the art may be used to indicate that that the threshold has been exceeded. If it is determined that the UVCE is "TRUE", then at block 415 the $UVCE_{frequency}$ (defined in TABLE 2) counter is incremented to track the number of times the threshold has been exceeded. The UVCE is also reset. In the current embodiment, the UVCE is reset by setting the UVCE to "FALSE".

After incrementing the $UVCE_{frequency}$, the $UVCE_{frequency}$ is stored in a database or in memory, for example memory 104 of FIG. 1, for use by other processes. After $UVCE_{frequency}$ is stored at block 420 or if it has been determined at block 410 that UVCE is not "TRUE", at block 425 it is determined whether $UVCE_{frequency}$ is greater than the $UVCE_{thresholdfrequency}$. The $UVCE_{thresholdfrequency}$ is based, at least in part, on the information stored at block 225 of FIG. 2. In one embodiment, the $UVCE_{thresholdfrequency}$ may be specified by an administrator via a GUI. The $UVCE_{thresholdfrequency}$ may also be specified in other embodiments by any other means known to one of ordinary skill in the art. If the $UVCE_{frequency}$ is not greater than the $UVCE_{thresholdfrequency}$ then method continues to retrieve any other available information at block 405. If the $UVCE_{frequency}$ is greater than the $UVCE_{thresholdfrequency}$, at block 430 the VPCCDB (as defined in TABLE 2) is searched for one or more appropriate virtual desktop pools that meet the required user experience criteria based, at least in part, on information stored at block 320.

At block 435, it is determined if an alternative virtual desktop pool exists where the $UVCC_{pool}$ (as defined in TABLE 2) is greater than the UVCC (as defined in TABLE 2) and where spare capacity is available. If an alternative virtual desktop pool exists then at block 440 the virtual desktop pool name is read that corresponds to the alternative virtual desktop pool. At block 445, the user is dynamically re-allocated to the virtual desktop pool corresponding to the read virtual desktop pool name. In one embodiment, one or more users are re-allocated to alternative virtual desktop pools. In another embodiment, two or more users are re-allocated to alternative virtual desktop pools. In one embodiment the virtual appliance 118 of FIG. 1 may re-allocate a user to an alternative virtual desktop pool based, at least in part, on 1) a user resource utilization profile and end-user experience and 2) capability and resource availability for each alternative pool. The virtual appliance 118 re-allocates users to alternative virtual desktop pools on an ongoing basis with any changes in the activities of any user being reflected in further re-allocation of a particular user or users to other alternative virtual desktop pools if necessary. The present invention is not limited to the use of the parameter(s) of FIG. 4 but rather any described parameters and thresholds or those known to one of ordinary skill in the art may be combined in any manner to dynamically ensure users are allocated to the virtual desktop pool that provides the users with an appropriate or suitable experience. The re-allocation may occur at the same timed interval as that defined for monitoring the parameters and thresholds, another predetermined timed interval, based on a semaphore, flag, alert, or event, or any other suitable interval known to one of ordinary skill in the art. After re-allocation, the process continues at block 405.

If at block 435 the recommended alternative virtual desktop pool does not exist, then it is recommended at block 450 that a virtual desktop pool be created that meets the requirements needed to provide an appropriate user experience. In one embodiment, when the virtual appliance 118 of FIG. 1 defines a particular virtual desktop pool configuration as recommended but the recommended configuration is not available in the existing set of virtual desktop pools, the virtual appliance 118 may provide an alert to notify an administrator or other configurator that while a particular virtual desktop pool is recommended for the user, it is not currently available as it does not exist and a different virtual desktop configuration should be created for the user to ensure the user sees a suitable end-user experience. The alert may incorporate a recommendation for an appropriate virtual desktop pool that includes a particular set of capabilities and configuration to provide an appropriate end-user experience. The recommended virtual desktop pool configuration may need to be configured by one or more information technology specialists, administrators, or others known by one of ordinary skill in the art. In one embodiment, the recommended configuration is illustrated in TABLE 1 by the pseudo-code RECOMMEND CREATION OF POOL WITH UVCC+1VCPU. At block 455 the new virtual desktop pool is created and the user is re-allocated to the created virtual desktop pool. According to how the process is instantiated, the process continues to block 405 according to the criteria of the mechanism that instantiates the process. For example, if the process is instantiated as a scheduled task, the process will begin at block 405 according to the criteria of the scheduled task. In another example, if the process is implemented as a timer, the process is instantiated at block 405 at the next timed interval according to the criteria of the timer. The process may be instantiated in any manner known to one of ordinary skill in the art.

Re-allocation of a user to a newly created virtual desktop pool or to an alternative virtual desktop pool may be performed by any means known to one of ordinary skill in the art. For example APIs available from virtual desktop vendors such as Dell vWorkspace, VMware, Citrix, or Microsoft may be used. While FIG. 4 illustrates one embodiment, it will be understood by one of ordinary skill in the art that any of the information retrieved may be used to determine whether a particular user should be re-allocated to an existing virtual desktop pool or whether a new virtual desktop pool should be created for the user. For example, available memory or available graphic APIs may be used to determine re-allocation of a user or users to virtual desktop pools. An alert or alarm may be triggered if re-allocation to a newly created virtual desktop pool, block 445, or to an alternative desktop pool, block 455, fails. The alert or alarm may notify an administrator that the attempted re-allocation failed and provide information related to the failure. The notification may be stored in a log, displayed, electronically mailed, stored in a database, or handled and processed by any other means known to one of ordinary skill in the art. In one embodiment, the user continues to operate utilizing the previously allocated virtual desktop pool. In another embodiment, the user may be re-allocated to a default alternative virtual desktop pool.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of dynamically re-allocating virtual desktop pools comprising:
    allocating a user to a virtual desktop pool;
    configuring a first monitoring process to point to a virtual environment;
    configuring a second monitoring process to point to the virtual desktop pool;
    monitoring resource utilization of the virtual desktop pool;
    monitoring capacity of the virtual desktop pool;
    storing parameter information associated with one or more parameters and threshold information associated with one or more thresholds, wherein the parameter information and the threshold information is based, at least in part, on the monitored resource utilization;
    storing capacity information and capability information of the virtual desktop pool, wherein the capacity information and the capability information is based, at least in part, on one or more characteristics of the virtual desktop pool;
    dynamically re-allocating the user to an alternative virtual desktop pool based, at least in part, on one or more of the stored parameter information, the stored threshold information, the stored capacity information and the stored capability information; and
    synthesizing one or more of the parameter information associated with any one of the one or more parameters and the threshold information associated with any one or more of the thresholds with one or more of the capacity information and the capability information, wherein the dynamic re-allocation is based, at least in part, on the synthesizing, wherein the synthesizing comprises:
        incrementing a parameter counter when at least one of the one or more parameters information is set;
        determining if the parameter counter exceeds the threshold information associated with the any one of the one or more parameters; and
        selecting the alternative virtual desktop pool based, at least in part, on the determination.

2. The method of claim 1, wherein dynamically re-allocating step comprises comparing the parameter information associated with the any one or more of the parameters and the threshold information associated with the any one or more of the thresholds.

3. The method of claim 1 further comprising:
    retrieving a parameter associated with resource utilization;
    retrieving a threshold associated with resource utilization, wherein the threshold sets an upper bound for resource utilization; and
    determining a named alternative virtual desktop pool based, at least in part, on the retrieved parameter and the retrieved threshold.

4. The method of claim 1 further comprising:
    recommending creating a new virtual desktop pool as the alternative virtual desktop pool; and
    creating the new virtual desktop pool.

5. The method of claim 1, wherein the virtual desktop pool comprises a group of identically configured virtual desktop infrastructure virtual machines.

6. The method of claim 1, wherein the one or more parameters comprise at least one of server level-related parameters, virtual desktop level-related parameters, and end-user experience-related parameters.

7. The method of claim 1, wherein the one or more characteristics includes available resources.

8. The method of claim 1 further comprising:
    recommending creating a new virtual desktop pool as the alternative virtual desktop pool; and
    creating the new virtual desktop pool.

9. A non-transitory computer readable medium including code for performing a method, the method comprising:
    allocating a user to a virtual desktop pool;
    configuring a first monitoring process to point to a virtual environment;
    configuring a second monitoring process to point to a virtual desktop pool;
    monitoring resource utilization of the virtual desktop pool;
    monitoring capacity of the virtual desktop pool;
    storing parameter information associated with one or more parameters and threshold information associated with one or more thresholds, wherein the parameter information and the threshold information is based, at least in part, on the monitored resource utilization;
    storing capacity information and capability information of the virtual desktop pool, wherein the capacity information and the capability information is based, at least in part, on one or more characteristics of the virtual desktop pool;

dynamically re-allocating the user to an alternative virtual desktop pool based, at least in part, on one or more of the stored parameter information, the stored threshold information, the stored capacity information and the stored capability information; and synthesizing one or more of the parameter information associated with any one of the one or more parameters and the threshold information associated with any one or more of the thresholds with one or more of the capacity information and the capability information, wherein the dynamic re-allocation is based, at least in part, on the synthesizing, wherein the synthesizing comprises:

incrementing a parameter counter when at least one of the one or more parameters information is set;

determining if the parameter counter exceeds the threshold information associated with the any one of the one or more parameters; and selecting the alternative virtual desktop pool based, at least in part, on the determination.

10. The method of claim 9, wherein dynamically re-allocating comprises comparing the parameter information associated with the any one or more of the parameters and the threshold information associated with the any one or more of the thresholds.

11. The method of claim 9 further comprising:
retrieving a parameter associated with resource utilization;
retrieving a threshold associated with resource utilization, wherein the threshold sets an upper bound for resource utilization; and
determining a named alternative virtual desktop pool based, at least in part, on the retrieved parameter and the retrieved threshold.

12. The method of claim 9, wherein the virtual desktop pool comprises a group of identically configured virtual desktop infra virtual machines.

13. The method of claim 9, wherein the one or more parameters comprise at least one of server level-related parameters, virtual desktop level-related parameters, and end-user experience-related parameters.

14. The method of claim 9, wherein the one or more characteristics includes available resources.

15. A virtual desktop infrastructure comprising:
a processor;
a memory;
a storage;
a virtual desktop manager;
one or more virtual desktop pools, wherein at least one of the one or more virtual desktop pools is associated with at least one user;
a virtualization host operable to:
launch one or more virtual machines; and
associate the one or more virtual machines with corresponding one or more virtual desktop environments, wherein the user is associated with at least one of the one or more virtual machines, and wherein the at least one of the one or more virtual desktop pools is associated with at least one of the one or more virtual desktop environments;
a virtual appliance comprising a synthesis component operable to:
allocate a user to the at least one of the one or more virtual desktop pools;
configure a first monitoring process to point to at least one of the one or more virtual desktop environments;
configure a second monitoring process to point to the at least one of the one or more virtual desktop pools;
monitor resource utilization of the at least one of the one or more virtual desktop pools;
monitor capacity of the at least one of the one or more virtual desktop pools;
store parameter information associated with one or more parameters and threshold information associated with one or more thresholds, wherein the parameter information and the threshold information is based, at least in part, on the monitored resource utilization;
store capacity information and capability information of the at least one of the one or more virtual desktop pools, wherein the capacity information and the capability information is based, at least in part, on one or more characteristics of the at least one of the one or more virtual desktop pools; and
re-allocate dynamically the user to an alternative virtual desktop pool based, at least in part, on at least one of the stored monitored resource utilization and the threshold information.

16. The virtual desktop infrastructure of claim 15, wherein dynamically re-allocating comprises comparing the parameter information associated with the any one or more of the parameters and the threshold information associated with the any one or more of the thresholds.

* * * * *